US008769917B1

(12) United States Patent
Howell (10) Patent No.: US 8,769,917 B1
(45) Date of Patent: Jul. 8, 2014

(54) BATTERY-OPERATED COMPACT RIDING ROTARY MOWER (76) Inventor: Jeffrey E. Howell, Clanton, AL (US)

( * ) Notice: Subject to any disclaimer, the term of this patent is extended or adjusted under 35 U.S.C. 154(b) by 518 days.

(21) Appl. No.: 12/914,259

(22) Filed: Oct. 28, 2010

Related U.S. Application Data (60) Provisional application No. 61/256,065, filed on Oct. 29, 2009.

(51) Int. Cl.
*A01D 69/00* (2006.01)

(52) U.S. Cl.
USPC .............................................. 56/11.9; 56/10.8

(58) Field of Classification Search
USPC .................. 56/10.6, 10.7, 10.8, 11.1, 11.9
See application file for complete search history.

(56) References Cited

U.S. PATENT DOCUMENTS

| | | | | |
|---|---|---|---|---|
| 3,732,671 A | * | 5/1973 | Allen et al. | 56/10.2 R |
| 4,145,864 A | | 3/1979 | Brewster, Jr. | |
| 4,194,345 A | * | 3/1980 | Pioch et al. | 56/17.5 |
| 5,127,215 A | * | 7/1992 | Wenzel | 56/11.1 |
| 5,337,543 A | * | 8/1994 | Kitamura et al. | 56/10.8 |
| 5,406,778 A | * | 4/1995 | Lamb et al. | 56/7 |
| 5,476,366 A | * | 12/1995 | Weihsmann | 416/220 A |
| 5,540,037 A | * | 7/1996 | Lamb et al. | 56/7 |
| 5,794,422 A | * | 8/1998 | Reimers et al. | 56/11.9 |
| 5,910,091 A | * | 6/1999 | Iida et al. | 56/16.7 |
| 5,934,051 A | * | 8/1999 | Hahn | 56/10.2 R |
| 6,571,542 B1 | * | 6/2003 | Fillman et al. | 56/10.6 |
| 6,591,593 B1 | * | 7/2003 | Brandon et al. | 56/10.6 |
| 6,906,483 B2 | * | 6/2005 | Tominaga et al. | 318/293 |
| 7,578,116 B1 | * | 8/2009 | Howell | 56/11.9 |
| 2002/0104300 A1 | * | 8/2002 | Hunt | 56/10.6 |
| 2003/0029149 A1 | * | 2/2003 | Fillman et al. | 56/10.6 |
| 2008/0264026 A1 | * | 10/2008 | Ishii et al. | 56/10.8 |
| 2009/0000839 A1 | * | 1/2009 | Ishii et al. | 180/65.5 |
| 2009/0065273 A1 | * | 3/2009 | Wyatt et al. | 180/65.8 |
| 2009/0301076 A1 | * | 12/2009 | Yasuda et al. | 60/491 |
| 2011/0289896 A1 | * | 12/2011 | Sasahara et al. | 56/11.9 |

\* cited by examiner

*Primary Examiner* — Thomas B Will
*Assistant Examiner* — Joan D Misa
(74) *Attorney, Agent, or Firm* — Bush Intellectual Property Law; Kenneth M. Bush (57) ABSTRACT

A compact battery-operated riding mower having a chassis with a rear end having two rear wheels, each rear wheel having a hydraulic motor attached thereto, a front end with two wheels, a cutting blade deck having one or more rotary cutting blades, and a power compartment. The mower is powered by a plurality of batteries connected in series. A first DC electric motor is positioned near the rear of the power compartment and a second DC electric motor is positioned near the front of the power compartment. The first electric motor is connected to one or more cutting blades to drive the cutting blades, and the second electric motor is connected to the hydraulic motors to drive the rear wheels. The electric motors are sealed and air-cooled.

16 Claims, 6 Drawing Sheets

BATTERY-OPERATED COMPACT RIDING ROTARY MOWER

CROSS-REFERENCE TO RELATED APPLICATION

This application claims the benefit of U.S. Provisional Application No. 61/256,065, filed Oct. 29, 2009, which application is incorporated herein by reference for all purposes.

FIELD OF THE INVENTION

This invention relates generally to electric rotary lawnmowers and, more particularly, to a compact battery-operated riding rotary lawnmower powered by two sealed dust-proof air-cooled DC motors wherein one motor drives the cutting blades and the other powers hydraulic motors to drive the rear wheels.

BACKGROUND OF THE INVENTION

Battery-operated riding mowers are known which have three wheels and reel-type blades in front of the vehicle. The reel blades rotate vertically in response to the forward motion of the mower. These mowers are useful mainly for mowing golf putting greens. Rotary blades are not suitable for these mowers because they would cause a lack of balance and be unstable. U.S. Pat. No. 4,145,864, issued to Brewster, discloses a battery-powered push rotary lawnmower. This lawnmower has a single motor, with a motor controller and potentiometer, which rotates a blade horizontally under the motor. The wheels are not powered by the motor. A battery-operated riding rotary lawnmower is desirable because it would operate cleaner, more dependably, and with less maintenance than a gasoline powered riding rotary lawnmower.

U.S. Pat. No. 7,578,116 discloses a battery-operated riding rotary lawnmower having batteries positioned in a U-shaped array around the right side, left side, and rear end of the chassis. The batteries are above and near the rear wheels to maintain a low center of gravity. The weight of the batteries is evenly distributed over the rear wheels to maintain balance. A single electric motor is positioned within a central portion of the U-shaped array of batteries and drives both the rotary cutting blades and the rear wheels. The use of a single motor in this system requires relatively complex electronics including a motor controller, a speed controller, a potentiometer, and a tachometer, in order to operate the cutting blades and drive transmissions independently. In some cases it may be desirable to simplify the system by using one motor to operate the cutting blade and one motor to operate the drive transmission. However, the use of two motors requires the riding mower to have an excessive length. What is needed is a two-motor system that will allow a compact battery-operated riding rotary mower.

SUMMARY OF THE INVENTION

The present invention is a battery-operated riding mower having a chassis with two rear wheels. Each rear wheel has a hydraulic motor attached thereto. The chassis also has front end with two caster-type wheels, a cutting blade deck having one or more rotary cutting blades, and a power compartment having a seat attached thereto. A plurality of batteries are connected in series and positioned evenly on the right side and left side of the chassis to distribute their weight evenly. A first electric motor is positioned near the rear of the power compartment and a second electric motor is positioned near the front of the power compartment. The first electric motor is connected to one or more cutting blades to drive the cutting blades, and the second electric motor is connected to the hydraulic motors to drive the rear wheels. Two motion control levers operate the hydraulic motors, wherein the motion control levers will actuate the hydraulic motors to rotate the rear wheels forward when the motion control levers are pushed in a first direction, to rotate the rear wheels in reverse when pulled in a second opposite direction, to brake the rear wheels when placed in a neutral position, and cause the mower to turn when one motion control lever is pushed or pulled farther than the other motion control lever. The first electric motor has a drive belt or chain to rotate the cutting blades, and the second electric motor has a drive belt or chain to drive the hydraulic motors, wherein the drive belt or chain of the second electric motor is positioned above the drive belt or chain of the first electric motor. The electrical circuit has two switches, each switch having a solenoid system, whereby one switch will turn on or off the first electric motor and the other switch will turn on or off the second electric motor. Each electric motor is sealed to prevent dust from entering the electric motor. The electric motor has an outer circumference with a plurality of cooling fins attached thereto. A fan is attached to one end of a central drive shaft of the electric motor, and a fan duct is positioned over the plurality of cooling fins and attached thereto. The fan will force air through the fan duct and across the cooling fins as the central shaft turns, thereby preventing the electric motor from overheating during operation. A trailer may be hitched to the riding mower, wherein the trailer carries batteries to power the electric motors.

An advantage of the present invention is a compact electric riding mower powered by batteries and driven by two electric DC motors.

Another advantage is a riding mower that uses hydraulic motors to drive the rear wheels forward or in reverse or to brake the wheels.

Another advantage is electric motors that are sealed and air-cooled to protect them from dust accumulation and overheating during operation.

Another advantage is even weight distribution of the batteries and electric motors on the chassis to provide stability and a low center of gravity to the riding mower.

Another advantage is no requirement for complex electronics including a motor controller, a speed controller, a potentiometer, and a tachometer.

Another advantage is an electric riding mower that is simple and inexpensive to manufacture, and easy to maintain and clean.

Another advantage is an electric riding mower that can carry its power supply of batteries on a trailer hitched to the riding mower.

DETAILED DESCRIPTION OF THE INVENTION

While the following description details the preferred embodiments of the present invention, it is to be understood that the invention is not limited in its application to the details of construction and arrangement of the parts illustrated in the accompanying drawings, since the invention is capable of other embodiments and of being practiced in various ways.

Figure 1:
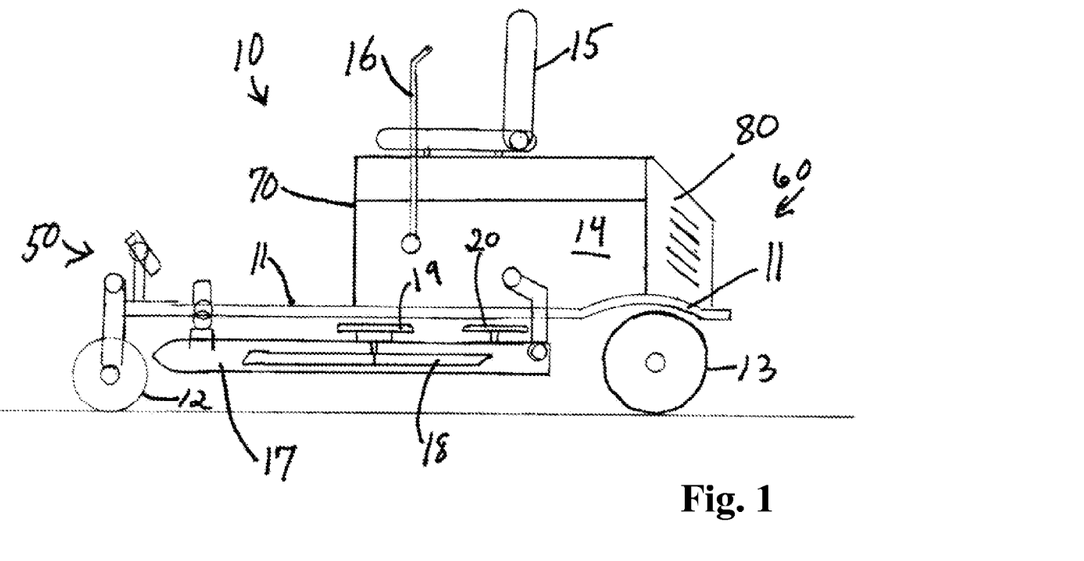
FIG. 1 shows a side view of the riding mower of the present invention.

FIG. 1 shows a side view of riding mower 10 of the present invention. Mower 10 has 8 6-volt deep cycle batteries 30 wired in series (see FIGS. 5-7). The mower 10 has a front end 50 and a rear end 60, a chassis 11 with a pair of, preferably, caster-type front wheels 12, a pair of rear wheels 13, a power compartment 14, a seat 15 positioned on the power compartment 14, two motion control levers 16, a cutting blade deck 17 showing a cutting blade 18, a deck blade pulley 19, and a deck idler pulley 20. The power compartment 14 has a front end 70 and a rear end 80.

Figure 2:
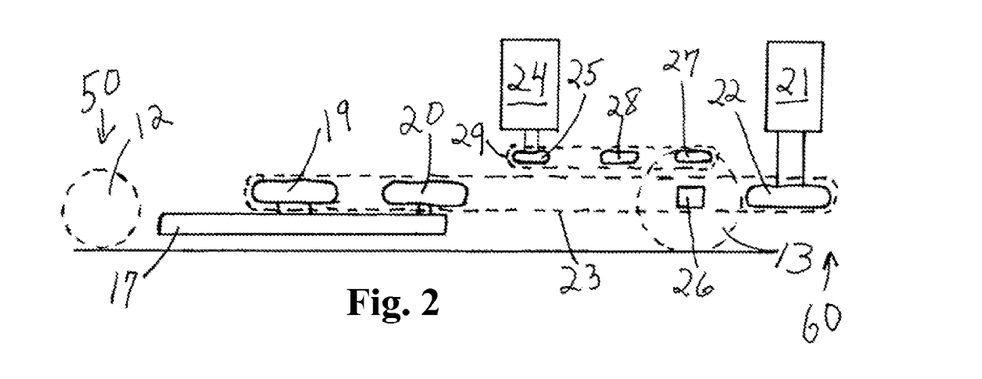
FIG. 2 shows a side view of the arrangement of the motors, pulleys, and drive belts.

FIG. 2 shows a side view of the arrangement of the motors, pulleys, and drive belts, all of which may be contained in the power compartment 14. Electric blade motor 21 is positioned near the rear end 80 of the power compartment 14. Electric blade motor 21 has a pulley 22. Near the front end of riding mower 10 is the blade deck 17 having blade pulleys 19 attached to blades 18, and idler pulleys 20. A drive belt 23 connects blade motor 21 and pulley 22 to the blade deck pulleys 19 and deck idler pulleys 20 so that blade motor 21 can rotate cutting blades 18 (not shown) at a desired rpm. Electric drive motor 24 is positioned in front of blade motor 21, toward the front end 70 of the power compartment 14. Electric drive motor 24 has a pulley 25. At the rear end 60 of riding mower 10 are hydraulic motors 26 which drive the rear wheels 13 to rotate or brake as desired. Hydraulic motors 26 have pulleys 27. A drive belt 29 connects the drive motor pulley 25 to hydraulic motor pulleys 27 to rotate the rear wheels 13. The drive belt 29 also engages an idler pulley 28. The drive belt 29 and pulleys 25, 27, and 28 are positioned above drive belt 23 and pulleys 19, 20, and 22.

Figure 3:
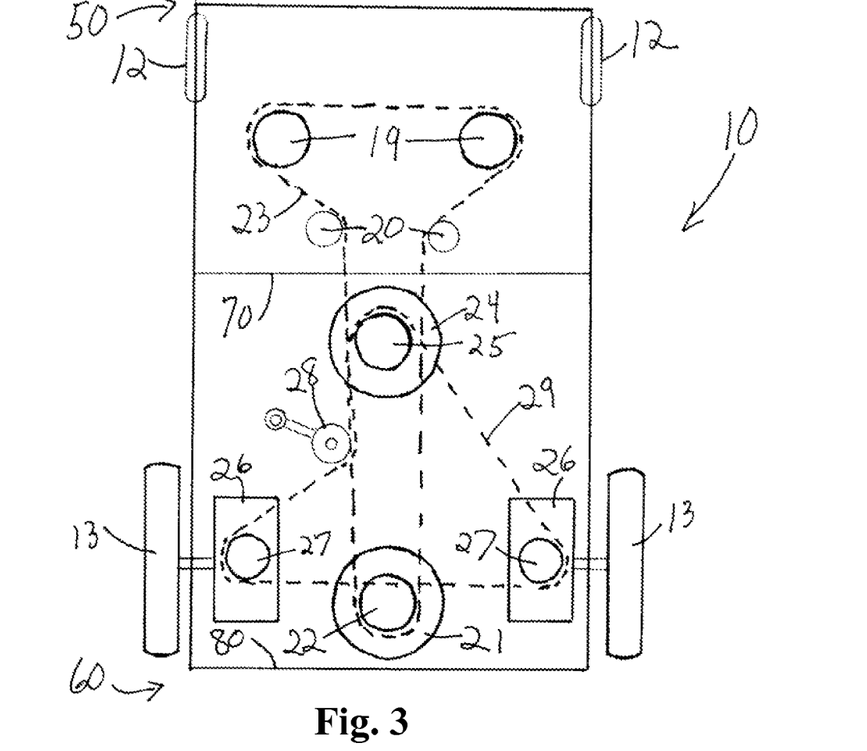
FIG. 3 shows a bottom view of the arrangement of the motors, pulleys, and drive belts.

FIG. 3 shows a bottom view of the arrangement of the motors, pulleys, and drive belts. Preferably, there are two blade pulleys 19 attached to cutting blades 18 (not shown) and two idler pulleys 20. Blade motor 21 drives the drive belt 23 to rotate the cutting blades 18. There is a hydraulic motor 26 attached to each rear wheel 13 to drive wheels 13. Drive motor 24 drives the drive belt 23 to power the hydraulic motors 26 to drive the rear wheels 13.

Figure 4:
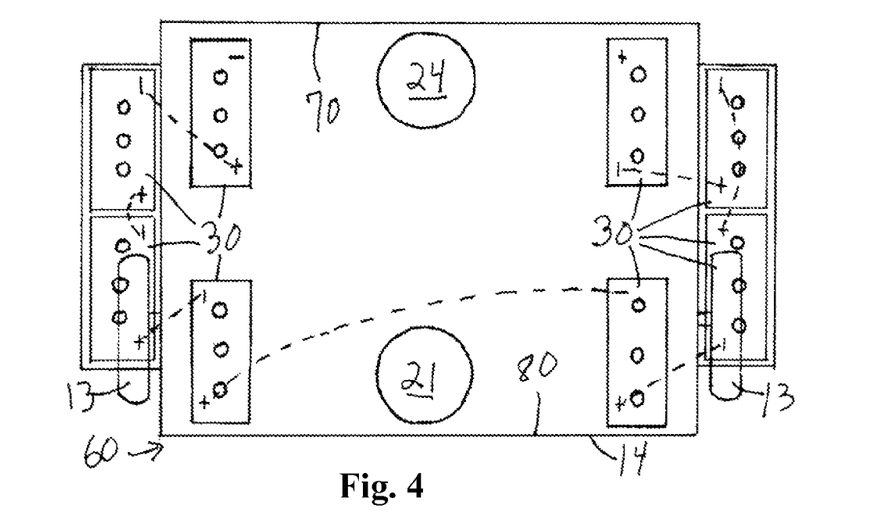
FIGS. 4-6 show various arrangements of the batteries within and adjacent to the power compartment.
Figure 5:
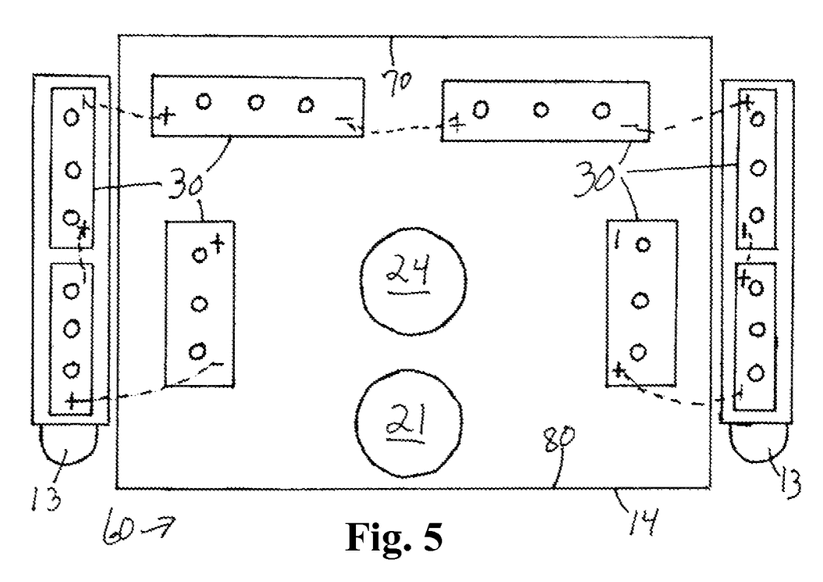
Figure 6:
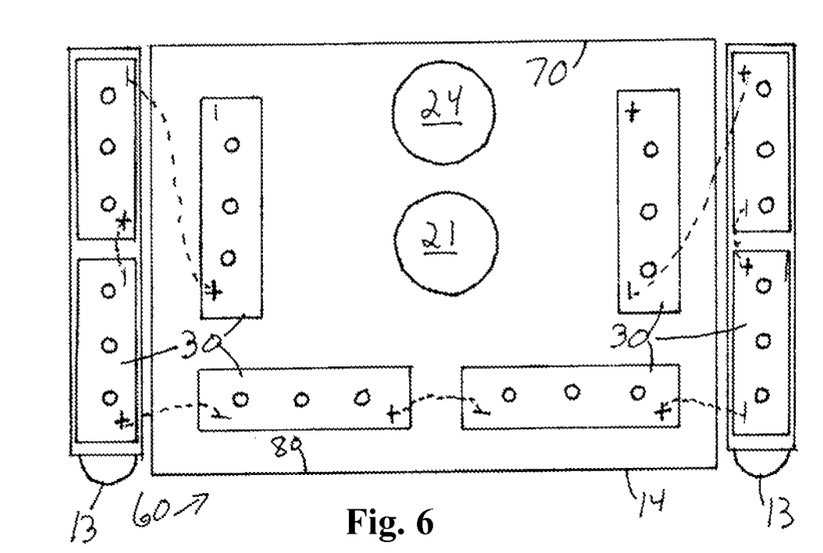

FIGS. 4-6 show various arrangements of the batteries 30 within and adjacent to the power compartment 14, with the preferred arrangement shown in FIG. 4. The batteries 30 are positioned in a U-shaped array around the right side and left side of the power compartment 14, and may also be placed around the rear end 80 of the power compartment 14. The batteries 30 are placed above and near the rear wheels 13 to maintain a low center of gravity. The weight of the batteries 30 is evenly distributed over the rear wheels 13 to maintain balance. The batteries are connected in series. The electric motors 21, 24 are, preferably, positioned within a central portion of the array of batteries 30 for balance and are positioned between the front end 70 and rear end 80 of the power compartment 14.

Figures 7, 8:
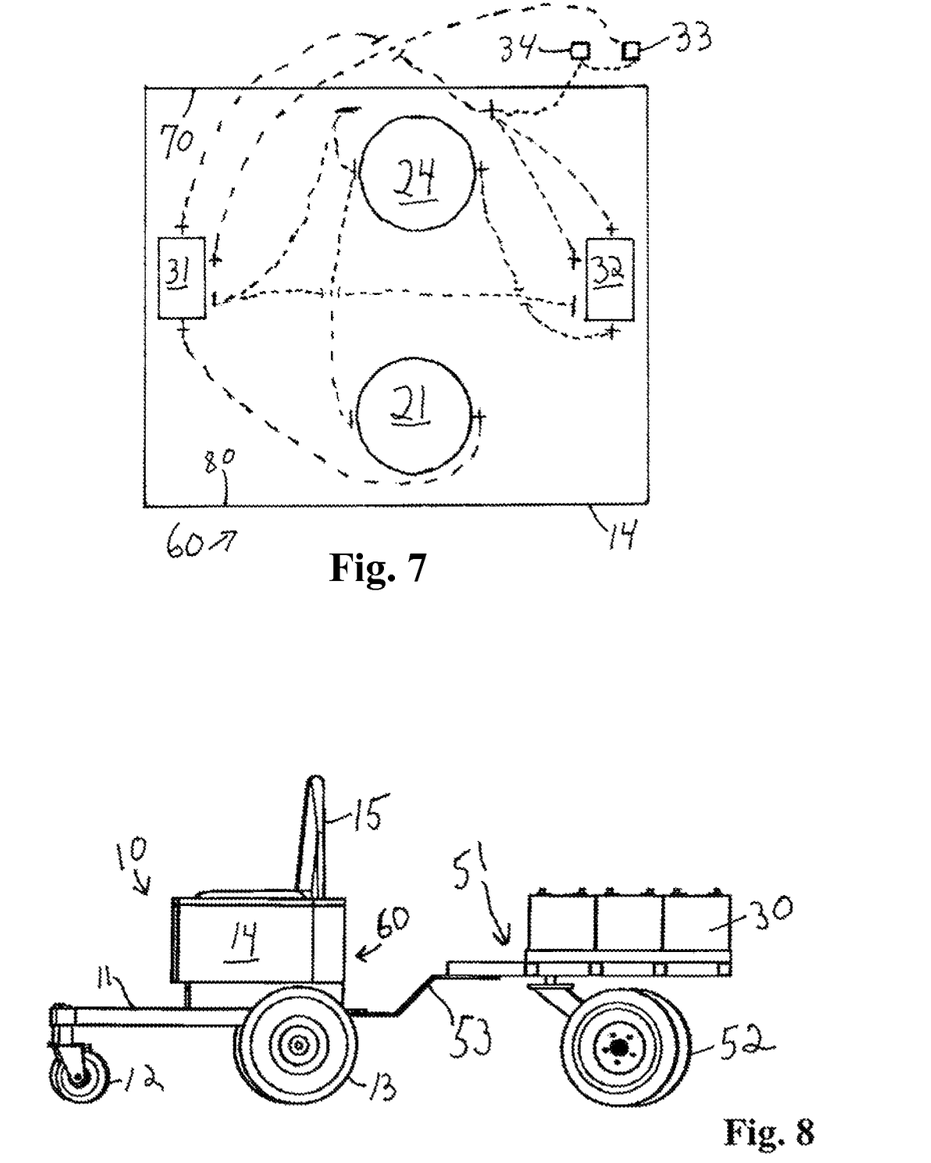
FIG. 7 illustrates the electrical wiring of a solenoid switch system to turn on and off the blade motor and the drive motor.
FIGS. 8-9 illustrate a trailer that can be hitched to the riding mower to carry the batteries which power the electric motors.

FIG. 7 illustrates the electrical wiring of a simple solenoid switch system to turn on and off blade motor 21 and drive motor 22. A first on/off switch 33 is connected to a first solenoid 31 and a second on/off switch 34 is connected to a second solenoid 32. The positive terminals of each solenoid are connected to the positive terminal of the series of batteries 30, and the negative terminal of each solenoid is connected to the negative terminal of the series of batteries 30. The negative terminal of the series of batteries 30 is connected to the negative terminals of electric motors 21 and 24, and a positive terminal of each solenoid is connected to the positive terminals of electric motors 21 and 24. In this manner, the switch 33 can turn on and off cutting blade motor 21 and switch 34 can turn on and off drive motor 24.

The motion control levers 16 control the forward, backward, and braking action of the hydraulic motors 26 by methods well known in the art. When the motion control levers 16 are in a neutral position a braking mechanism is activated in the hydraulic drive motors 26 and no fluid passes in either direction through the drive motors 26. When the motion control levers 16 are pushed forward, for example, the riding mower 10 will move forward. When the motion control levers 16 are pulled backwards, for example, the riding mower 10 will move backwards. The riding mower 10 will turn when one motion control lever 16 is pushed or pulled farther than the other.

Figure 9:
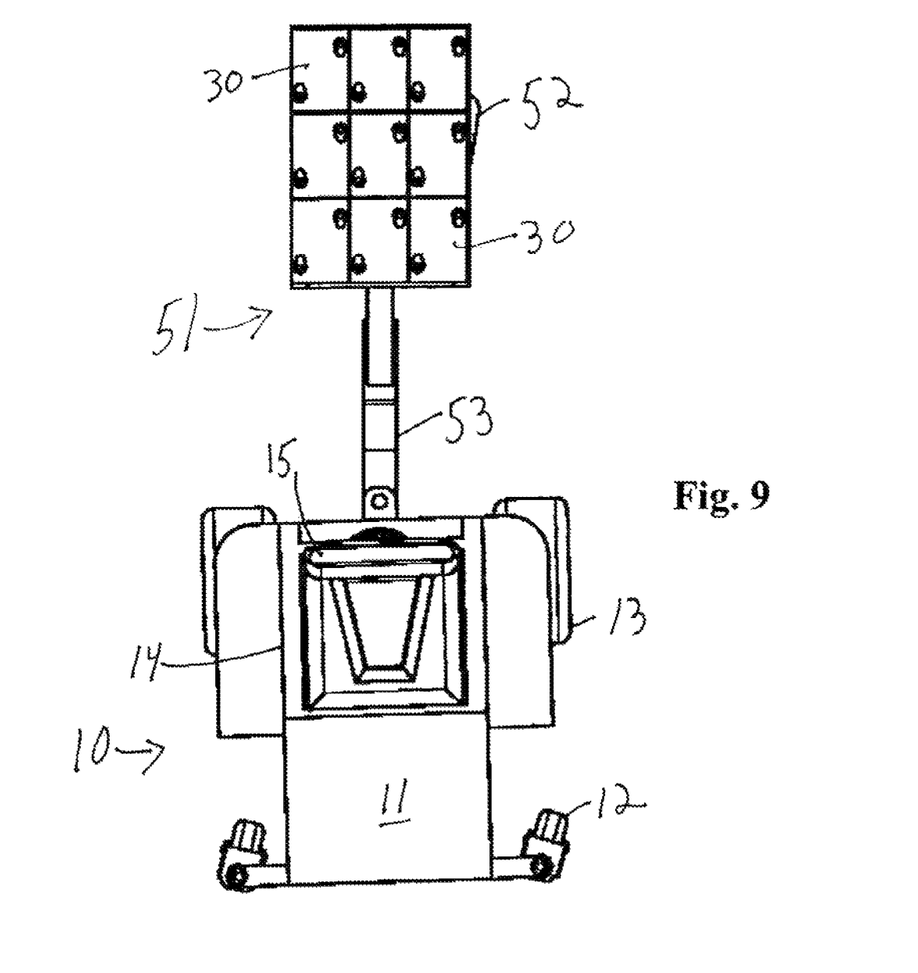

FIG. 8 shows a side view of a trailer 51 which can be attached to mower 10. Trailer 51 has one or more wheels 52 and may be attached by a hitch assembly 53 to the chassis 11 at the rear end 60 of the mower 10. The trailer may carry one or more batteries 30 to power the motors 21, 24. FIG. 9 shows a top view of the trailer 51 with an array of batteries to power the riding mower 10.

A major problem that can occur with riding lawnmowers powered by electric motors is that dust can get into the motor. If dust accumulates in the motor it may overheat and burn out, or otherwise become damaged. A preferred embodiment of the present invention is an electric powered riding lawn mower that has 72-, 48-, 36-, or 24-volt DC brushed sealed dust-proof motors.

Figure 10:
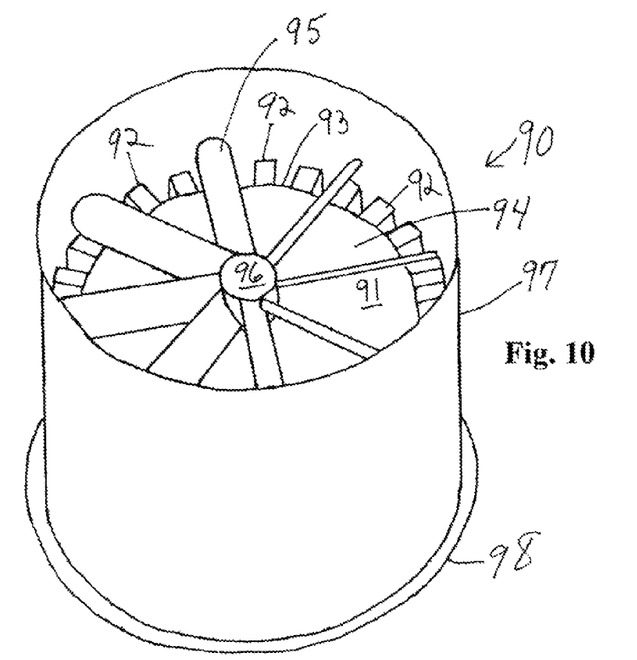
FIGS. 10-12 illustrate an air-cooled, DC, brushed, sealed, and dust-proof motor for driving the cutting blades and hydraulic motors of the riding mower.
Figure 11:
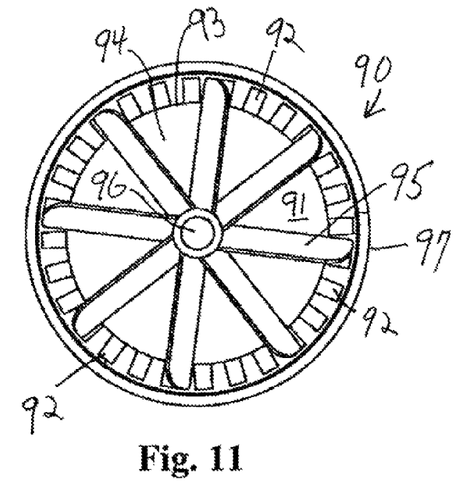
Figure 12:
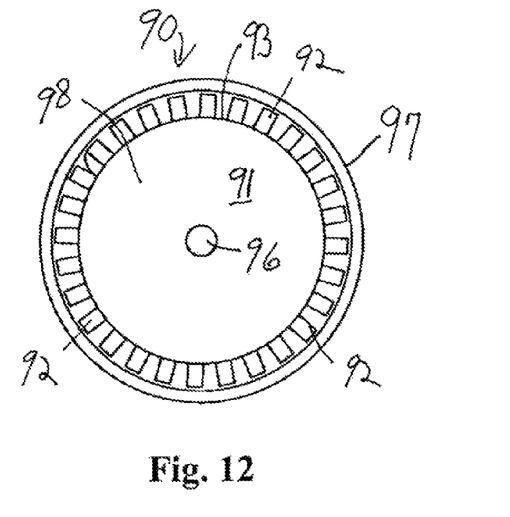

FIG. 10 shows a perspective view of a sealed dust-proof DC motor assembly 90 of the present invention. The DC motor 91 has a plurality of longitudinal fins 92 attached on the outer circumference 93 of the motor 91. A top surface 94 has a fan assembly 95 attached to a central drive shaft 96 of motor 91. A fan duct 97 is positioned over the plurality of cooling fins 92 and is attached thereto. In operation, the fan assembly 95 draws air into the fan duct 97 at the top surface 94 of motor 91 and directs the air flow over the cooling fins 92 and out through the duct at the opposite bottom end 98 of motor 91. The air flow across the cooling fins 92 prevents the sealed motor 91 from overheating during operation. FIG. 11 shows a top view of the sealed dust-proof DC motor assembly 90, and FIG. 12 shows a bottom view thereof.

The foregoing description has been limited to specific embodiments of this invention. It will be apparent, however, that variations and modifications may be made by those skilled in the art to the disclosed embodiments of the invention, with the attainment of some of all of its advantages and without departing from the spirit and scope of the present invention. For example, any suitable type of 6-volt to 12-volt DC batteries can be used to power the electric riding mower of the present invention. DC or AC electric motors may be employed. One or more cutting blades may be used. Any suitable type of instrument panel can be used, and any suitable type of cutting deck lift lever may be used. Any suitable type of sealant may be used to seal the motors. Cooling fins may be constructed of any suitable type of metal. Air may be driven from the bottom end of the motor and out of the fan duct at the top of the motor. Drive chains and sprockets may be used instead of drive belts and pulleys.

It will be understood that various changes in the details, materials, and arrangements of the parts which have been described and illustrated above in order to explain the nature of this invention may be made by those skilled in the art without departing from the principle and scope of the invention as recited in the following claims.

The invention claimed is:

1. A battery-operated riding mower, comprising:
   a) a chassis having a rear end with two rear wheels, each rear wheel having a hydraulic motor attached thereto, a front end with two wheels, a cutting blade deck having one or more cutting blades, and a power compartment positioned near said rear wheels;
   b) said power compartment having a front end, a rear end, and a plurality of batteries, said batteries connected in series to power a first electric motor and a second electric motor;
   c) said first electric motor positioned inside and near the rear end of said power compartment near said rear wheels, and said second electric motor positioned inside and near said front end of said power compartment;
   d) said first electric motor connected to said one or more cutting blades to drive said cutting blades, and said second electric motor connected to the hydraulic motors to drive both said rear wheels; and
   e) two switches, one of said switches having a solenoid and the other of said switches having a solenoid wherein a positive terminal of each said solenoid is connected to a positive terminal of said batteries connected in series, a negative terminal of each said solenoid is connected to a negative terminal of said batteries connected in series, a negative terminal of said batteries connected in series is connected to negative terminals of said first electric motor and said second electric motor, and a positive terminal of each said solenoid is connected to positive terminals of said first electric motor and said second electric motor, so that said one of said switches turns on and off said first electric motor and said other of said switches turns on and off said second electric motor, thereby allowing said first motor and said second motor to be switched on and off independently of each other.

2. The battery-operated riding mower of claim 1, further comprising two motion control levers operating the hydraulic motors, wherein the motion control levers will actuate the hydraulic motors to rotate the rear wheels forward when the motion control levers are pushed in a first direction, to rotate the rear wheels in reverse when pulled in a second opposite direction, to brake the rear wheels when placed in a neutral position, and cause the mower to turn when one motion control lever is pushed or pulled farther than the other motion control lever.

3. The battery-operated riding mower of claim 1, further comprising the first electric motor having a drive belt or chain to rotate said cutting blades, and the second electric motor having a drive belt or chain to drive said hydraulic motors, wherein the drive belt or chain of the second electric motor is positioned above the drive belt or chain of the first electric motor.

4. The battery-operated riding mower of claim 1, wherein each electric motor being sealed to prevent dust from entering the electric motor, the electric motor having an outer circumference with a plurality of cooling fins attached thereto, a fan attached to one end of a central drive shaft of the electric motor, a fan duct positioned over said plurality of cooling fins, and the inside of said fan duct attached to said cooling fins, and wherein said fan will force air through said fan duct and across said cooling fins as said central shaft turns, thereby preventing said electric motor from overheating during operation.

5. The battery-operated riding mower of claim 1, further comprising a trailer with wheels hitched to said rear end of said riding mower, wherein said trailer carries batteries to power said first and said second electric motors.

6. The battery-operated riding mower of claim 1 wherein the wheels on the front end of the riding mower are caster-type wheels, a seat is attached to the power compartment, and the batteries are positioned evenly on the right side and left side of the chassis.

7. A battery-operated riding mower, comprising:
   a) a chassis having a rear end with two rear wheels, each rear wheel having a hydraulic motor attached thereto, a front end with two wheels, a cutting blade deck having one or more cutting blades, and a power compartment positioned near said rear wheels;
   b) said power compartment having a front end, a rear end, and a plurality of batteries, said batteries connected in series to power a first electric motor and a second electric motor;
   c) said first electric motor positioned inside and near the rear end of said power compartment and said second electric motor positioned inside and near the front end of said power compartment;
   d) said first electric motor connected to said one or more cutting blades to drive said cutting blades, and said second electric motor connected to the hydraulic motors to drive both said rear wheels;
   e) two motion control levers operating the hydraulic motors, wherein the motion control levers will actuate the hydraulic motors to rotate the rear wheels forward when the motion control levers are pushed in a first direction, to rotate the rear wheels in reverse when pulled in a second opposite direction, to brake the rear wheels when placed in a neutral position, and cause the mower to turn when one motion control lever is pushed or pulled farther than the other motion control lever;
   f) the first electric motor having a drive belt or chain to rotate said cutting blades, and the second electric motor having a drive belt or chain to drive said hydraulic motors, wherein the drive belt or chain of the second electric motor is positioned above the drive belt or chain of the first electric motor; and
   g) two switches, one of said switches having a solenoid and the other of said switches having a solenoid wherein a positive terminal of each said solenoid is connected to a positive terminal of said batteries connected in series, a negative terminal of each said solenoid is connected to a negative terminal of said batteries connected in series, a negative terminal of said batteries connected in series is connected to negative terminals of said first electric motor and said second electric motor, and a positive terminal of each said solenoid is connected to positive terminals of said first electric motor and said second electric motor, so that said one of said switches turns on and off said first electric motor and said other of said switches turns on and off said second electric motor, thereby allowing said first motor and said second motor to be switched on and off independently of each other.

8. The battery-operated riding mower of claim 7, further comprising each electric motor being sealed to prevent dust from entering the electric motor, the electric motor having an outer circumference with a plurality of cooling fins attached thereto, a fan attached to one end of a central drive shaft of the electric motor, a fan duct positioned over said plurality of cooling fins, and the inside of said fan duct attached to said cooling fins, and wherein said fan will force air through said fan duct and across said cooling fins as said central shaft turns, thereby preventing said electric motor from overheating during operation.

9. The battery-operated riding mower of claim 7, further comprising a trailer with wheels hitched to said rear end of said riding mower, wherein said trailer carries batteries to power said first and said second electric motors.

10. The battery-operated riding mower of claim 7 wherein the wheels on the front end of the riding mower are caster-type wheels, a seat is attached to the power compartment, and the batteries are positioned evenly on the right side and left side of the chassis.

11. A battery-operated riding mower, comprising:
   a) a chassis having a rear end with two rear wheels, each rear wheel having a hydraulic motor attached thereto, a front end with two wheels, a cutting blade deck having one or more cutting blades, and a power compartment positioned near said rear wheels;
   b) said power compartment having a front end, a rear end, and a plurality of batteries, said batteries connected in series to power a first electric motor and a second electric motor;
   c) said first electric motor positioned inside and near the rear end of said power compartment and said second electric motor positioned inside and near the front end of said power compartment;
   d) said first electric motor connected to said one or more cutting blades to drive said cutting blades, and said second electric motor connected to the hydraulic motors to drive both said rear wheels;
   e) two motion control levers operating the hydraulic motors, wherein the motion control levers will actuate the hydraulic motors to rotate the rear wheels forward when the motion control levers are pushed in a first direction, to rotate the rear wheels in reverse when pulled in a second opposite direction, to brake the rear wheels when placed in a neutral position, and cause the mower to turn when one motion control lever is pushed or pulled farther than the other motion control lever;
   f) the first electric motor having a drive belt or chain to rotate said cutting blades, and the second electric motor having a drive belt or chain to drive said hydraulic motors, wherein the drive belt or chain of the second electric motor is positioned above the drive belt or chain of the first electric motor;
   g) two switches, one of said switches having a solenoid and the other of said switches having a solenoid wherein a positive terminal of each said solenoid is connected to a positive terminal of said batteries connected in series, a negative terminal of each said solenoid is connected to a negative terminal of said batteries connected in series, a negative terminal of said batteries connected in series is connected to negative terminals of said first electric motor and said second electric motor, and a positive terminal of each said solenoid is connected to positive terminals of said first electric motor and said second electric motor, so that said one of said switches turns on and off said first electric motor and said other of said switches turns on and off said second electric motor, thereby allowing said first motor and said second motor to be switched on and off independently of each other; and
   h) each electric motor being sealed to prevent dust from entering the electric motor, the electric motor having an outer circumference with a plurality of cooling fins attached thereto, a fan attached to one end of a central drive shaft of the electric motor, a fan duct positioned over said plurality of cooling fins, and the inside of said fan duct attached to said cooling fins, and wherein said fan will force air through said fan duct and across said cooling fins as said central shaft turns, thereby preventing said electric motor from overheating during operation.

12. The battery-operated riding mower of claim 11, further comprising a trailer with wheels hitched to said rear end of said riding mower, wherein said trailer carries batteries to power said first and said second electric motors.

13. The battery-operated riding mower of claim 11 wherein the wheels on the front end of the riding mower are caster-type wheels, a seat is attached to the power compartment, and the batteries are positioned evenly on the right side and left side of the chassis.

14. A battery-operated riding mower, comprising:
   a) a chassis having a rear end with two rear wheels, each rear wheel having a hydraulic motor attached thereto, a front end with two caster-type wheels, a cutting blade deck having one or more cutting blades, a power compartment having a seat attached thereto, and said power compartment positioned near said rear wheels;
   b) said power compartment having a front end, a rear end, and a plurality of batteries, said batteries connected in series to power a first electric motor and a second electric motor and positioned evenly on the right side and the left side of the chassis;
   c) said first electric motor positioned inside and near the rear of said power compartment and said second electric motor positioned inside and near the front of said power compartment;
   d) said first electric motor connected to said one or more cutting blades to drive said cutting blades, and said second electric motor connected to the hydraulic motors to drive both said rear wheels;
   e) two motion control levers operating the hydraulic motors, wherein the motion control levers will actuate the hydraulic motors to rotate the rear wheels forward when the motion control levers are pushed in a first direction, to rotate the rear wheels in reverse when pulled in a second opposite direction, to brake the rear wheels when placed in a neutral position, and cause the mower to turn when one motion control lever is pushed or pulled farther than the other motion control lever;
   f) the first electric motor having a drive belt or chain to rotate said cutting blades, and the second electric motor having a drive belt or chain to drive said hydraulic motors, wherein the drive belt or chain of the second electric motor is positioned above the drive belt or chain of the first electric motor;
   g) two switches, one of said switches having a solenoid and the other of said switches having a solenoid wherein a positive terminal of each said solenoid is connected to a positive terminal of said batteries connected in series, a negative terminal of each said solenoid is connected to a negative terminal of said batteries connected in series, a negative terminal of said batteries connected in series is connected to negative terminals of said first electric motor and said second electric motor, and a positive terminal of each said solenoid is connected to positive terminals of said first electric motor and said second electric motor, so that said one of said switches turns on and off said first electric motor and said other of said switches turns on and off said second electric motor, thereby allowing said first motor and said second motor to be switched on and off independently of each other;

h) each electric motor being sealed to prevent dust from entering the electric motor, the electric motor having an outer circumference with a plurality of cooling fins attached thereto, a fan attached to one end of a central drive shaft of the electric motor, a fan duct positioned over said plurality of cooling fins, and the inside of said fan duct attached to said cooling fins, and wherein said fan will force air through said fan duct and across said cooling fins as said central shaft turns, thereby preventing said electric motor from overheating during operation; and i) a trailer with wheels hitched to said rear end of the riding mower, wherein said trailer carries batteries to power said first and said second electric motors.

15. An electric motor, comprising an outer circumference with a plurality of cooling fins attached thereto, a fan attached to one end of a central drive shaft of the electric motor, a fan duct positioned over said plurality of cooling fins, and the inside of said fan duct attached to said cooling fins, and wherein said fan will force air through said fan duct and across said cooling fins as said central shaft turns, thereby preventing said electric motor from overheating during operation.

16. The electric motor of claim 15 wherein said motor is a 72-, 48-, 36-, or 24-volt, DC, brushed, sealed, and dust-proof motor.

\* \* \* \* \*